US010528376B2

United States Patent
Devendran et al.

(10) Patent No.: US 10,528,376 B2
(45) Date of Patent: Jan. 7, 2020

(54) VIRTUAL MACHINE MANAGEMENT

(71) Applicant: International Business Machines Corporation, Armonk, NY (US)

(72) Inventors: Saravanan Devendran, Bangalore (IN); Venkatesh Sainath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 15/492,829

(22) Filed: Apr. 20, 2017

(65) Prior Publication Data

US 2018/0307511 A1    Oct. 25, 2018

(51) Int. Cl.
*G06F 9/455*  (2018.01)
*G06F 9/50*  (2006.01)

(52) U.S. Cl.
CPC ........ *G06F 9/45558* (2013.01); *G06F 9/5077* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,689,054 B1 * | 4/2014 | van der Goot | G06F 11/1438 714/43 |
| 8,875,133 B2 | 10/2014 | Hayward et al. | |
| 9,104,461 B2 | 8/2015 | Neary et al. | |
| 9,280,371 B2 | 3/2016 | Garza et al. | |
| 9,323,570 B2 | 4/2016 | Ashihara et al. | |
| 9,740,519 B2 | 8/2017 | Tsirkin | |
| 2006/0190942 A1 | 8/2006 | Inoue | |
| 2010/0242045 A1 | 9/2010 | Swamy | |
| 2012/0110086 A1 | 5/2012 | Baitinger | |
| 2012/0254445 A1 * | 10/2012 | Kawamoto | G06F 9/5077 709/226 |
| 2013/0305242 A1 * | 11/2013 | Wang | G06F 9/45558 718/1 |
| 2014/0089916 A1 * | 3/2014 | Gross | G06F 11/0712 718/1 |
| 2014/0344814 A1 | 11/2014 | Jamjoom | |
| 2014/0351809 A1 | 11/2014 | Chawla | |
| 2015/0309828 A1 | 4/2015 | Shaik et al. | |
| 2015/0135175 A1 | 5/2015 | Bacher | |
| 2015/0268996 A1 | 9/2015 | Fan | |

(Continued)

OTHER PUBLICATIONS

Accelerated Examination Support Document, U.S. Appl. No. 15/727,102, signed Sep. 25, 2017, 29 pgs.

(Continued)

*Primary Examiner* — Gregory A Kessler
(74) *Attorney, Agent, or Firm* — Grant M. McNeilly

(57) ABSTRACT

Disclosed aspects relate to virtual machine management in a shared pool of configurable computing resources. A single multi-node server may be established. The single multi-node server may include a running virtual machine, a set of computing resources that includes a possessed subset of the set of computing resources, a source hypervisor, and a target hypervisor. The possessed subset of the set of computing resources may be assigned to the target hypervisor from the source hypervisor. The running virtual machine may be run using the target hypervisor.

17 Claims, 9 Drawing Sheets

(56) References Cited

U.S. PATENT DOCUMENTS

2016/0306648 A1 10/2016 Deguillard et al.
2017/0220392 A1 8/2017 Cropper et al.

OTHER PUBLICATIONS

Devendran et al., "Virtual Machine Management," U.S. Appl. No. 15/727,102, filed Oct. 5, 2017.
List of IBM Patents or Patent Applications Treated as Related, Oct. 3, 2017, 2 pgs.
Butler, "Startup takes aim at multi-hypervisor management", Network World, Jan. 22, 2013. Last accessed Apr. 7, 2017. 4 pages. http://www.networkworld.com/article/2162937/virtualization/startup-takes-aim-at-multi-hypervisor-management.html.
Chandrakar, et al, "Configuration of Floating Node Boundaries", U.S. Appl. No. 14/949,975, filed Nov. 24, 2015.
Mell et al., "The NIST Definition of Cloud Computing", Recommendations of the National Institute of Standards and Technology, Special Publication 800-145. Sep. 2011. 7 pages.

\* cited by examiner

VIRTUAL MACHINE MANAGEMENT

BACKGROUND

This disclosure relates generally to computer systems and, more particularly, relates to virtual machine management in a shared pool of configurable computing resources. The amount of resources that need to be managed in a shared pool of configurable computing resources is increasing. As resources needing to be managed increase, the need for virtual machine management in a shared pool of configurable computing resources may also increase.

SUMMARY

Aspects of the disclosure relate to virtual machine management in a shared pool of configurable computing resources. Virtual machines running on the same multi-node server may be mobilized to enable flow of a virtual machine from a source hypervisor to a target hypervisor using hypervisor communication. The target hypervisor may dynamically assume control of the resources for a particular virtual machine from the source hypervisor while the particular virtual machine is running. For instance, computing resources for a virtual machine hosted by a source hypervisor may be re-assigned to the target hypervisor to allow the target hypervisor to take control of the computing resources without copying data or migrating the virtual machine itself. A defragmentation process may be performed to consolidate resources for a virtual machine that is fragmented across multiple processors. Portions of computing resources for a virtual machine may be assigned to the target hypervisor as they become available.

Disclosed aspects relate to virtual machine management in a shared pool of configurable computing resources. A single multi-node server may be established. The single multi-node server may include a running virtual machine, a set of computing resources that includes a possessed subset of the set of computing resources, a source hypervisor, and a target hypervisor. The possessed subset of the set of computing resources may be assigned to the target hypervisor from the source hypervisor. The running virtual machine may be run using the target hypervisor.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
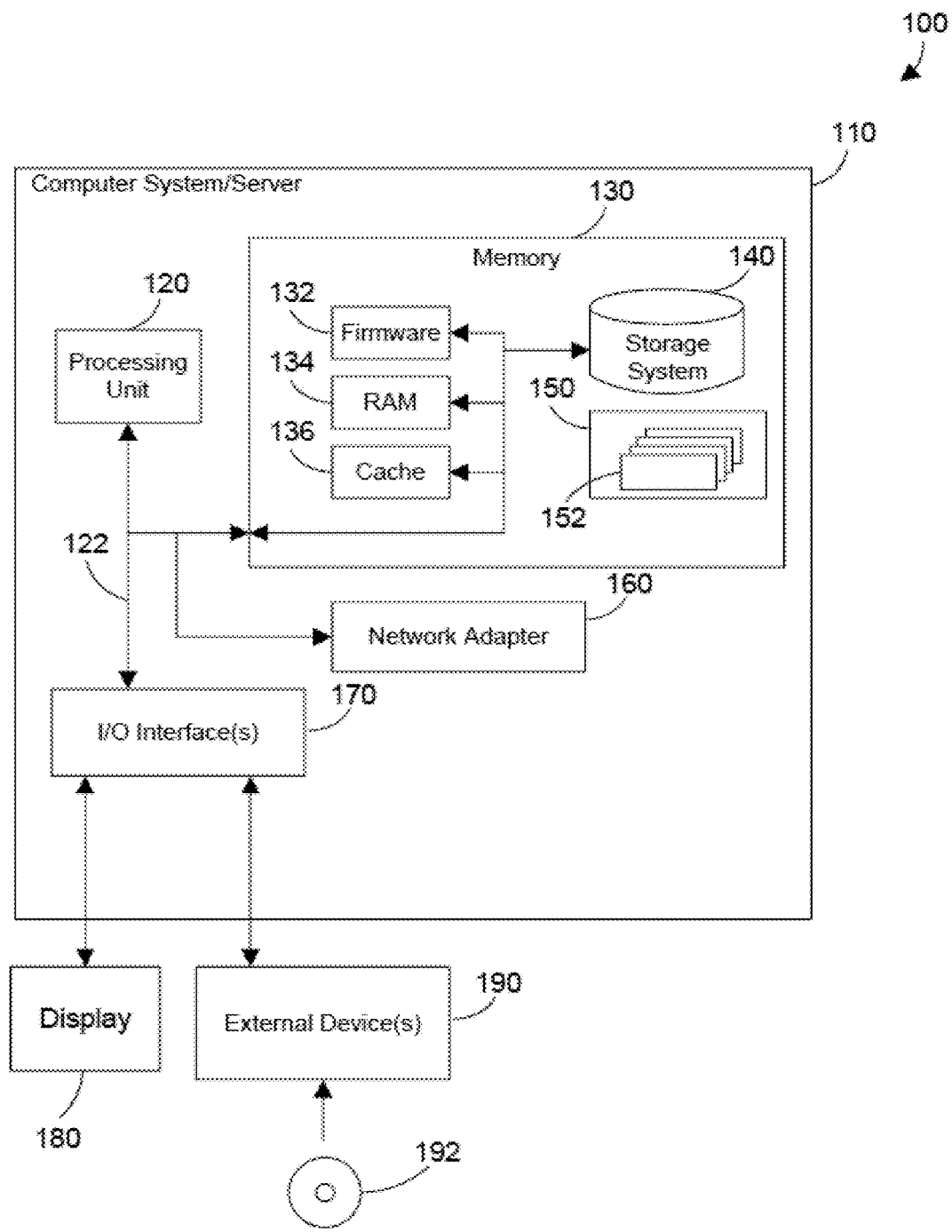
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to virtual machine management in a shared pool of configurable computing resources. Virtual machines running on the same multi-node server may be mobilized to enable flow of a virtual machine from a source hypervisor to a target hypervisor using intra/inter-hypervisor communication. The target hypervisor may dynamically assume control of the resources for a particular virtual machine from the source hypervisor while the particular virtual machine is running (e.g., the hypervisor may acquire the logical partitions for the virtual machine hosted by the source hypervisor). For instance, computing resources (e.g., memory, processor) for a virtual machine hosted by a source hypervisor may be re-assigned to the target hypervisor to allow the target hypervisor to take control of the computing resources without copying data or migrating the virtual machine itself. A defragmentation process may be performed to consolidate resources for a virtual machine that is fragmented across multiple processors. Portions of computing resources for a virtual machine may be assigned to the target hypervisor as they become available. Leveraging dynamic assignment of computing resources for a virtual machine from a source hypervisor to a target hypervisor may be associated with benefits including virtual machine mobility, workload consolidation, and computing resource management efficiency.

Hypervisors are one tool used to manage virtual machines on multi-node server environments. Some multi-node server environments support the use of multiple hypervisors, such that each hypervisor maintains control of separate groups of virtual machines. Aspects of the disclosure relate to the recognition that, in some situations, sharing resources for virtual machines between hypervisors on the same multi-node system may be associated with challenges such as virtual machine downtime, loss of efficiency, and migration constraints. Accordingly, aspects of the disclosure relate to mobilizing the virtual machines between hypervisors running on the same system such that the computing resources for a particular virtual machine running on a source hypervisor may be dynamically assigned to a target hypervisor. Dynamically assigning computing resources for a virtual machine from a source hypervisor to a target hypervisor may be performed without recreating/copying data from one hypervisor to another or migrating the virtual machine itself. As such, the need for moving/copying large amounts of data from one hypervisor to another may be avoided, facilitating resource-efficient sharing of virtual machine resources on a multi-node server having multiple hypervisors.

Aspects of the disclosure include a method, system, and computer program product for virtual machine management in a shared pool of configurable computing resources. A single multi-node server may be established. The single multi-node server may include a running virtual machine, a set of computing resources that includes a possessed subset of the set of computing resources, a source hypervisor, and a target hypervisor. The possessed subset of the set of computing resources may be assigned to the target hypervisor from the source hypervisor. The running virtual machine may be run using the target hypervisor.

In embodiments, management of a running virtual machine may be transferred to the target hypervisor from the source hypervisor without copying a set of running virtual machine data from a set of memory regions. In embodiments, it may be detected that the running virtual machine is running across a plurality of nodes of the single multi-node server, and assignment of the possessed subset of the set of computing resources may be transferred to the target hypervisor from the source hypervisor. In embodiments, a set of memory regions of a segment of a node coupled with the source hypervisor may be assembled with respect to the first temporal period, the target hypervisor may be coupled with the set of memory regions of the segment of the node with respect to the second temporal period, and the source hypervisor may be decoupled with the set of memory regions of the segment of the node with respect to the second temporal period. In embodiments, both the source and target hypervisors may be configured using a single service processor. Altogether, aspects of the disclosure can have performance or efficiency benefits. Aspects may save resources such as bandwidth, disk, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
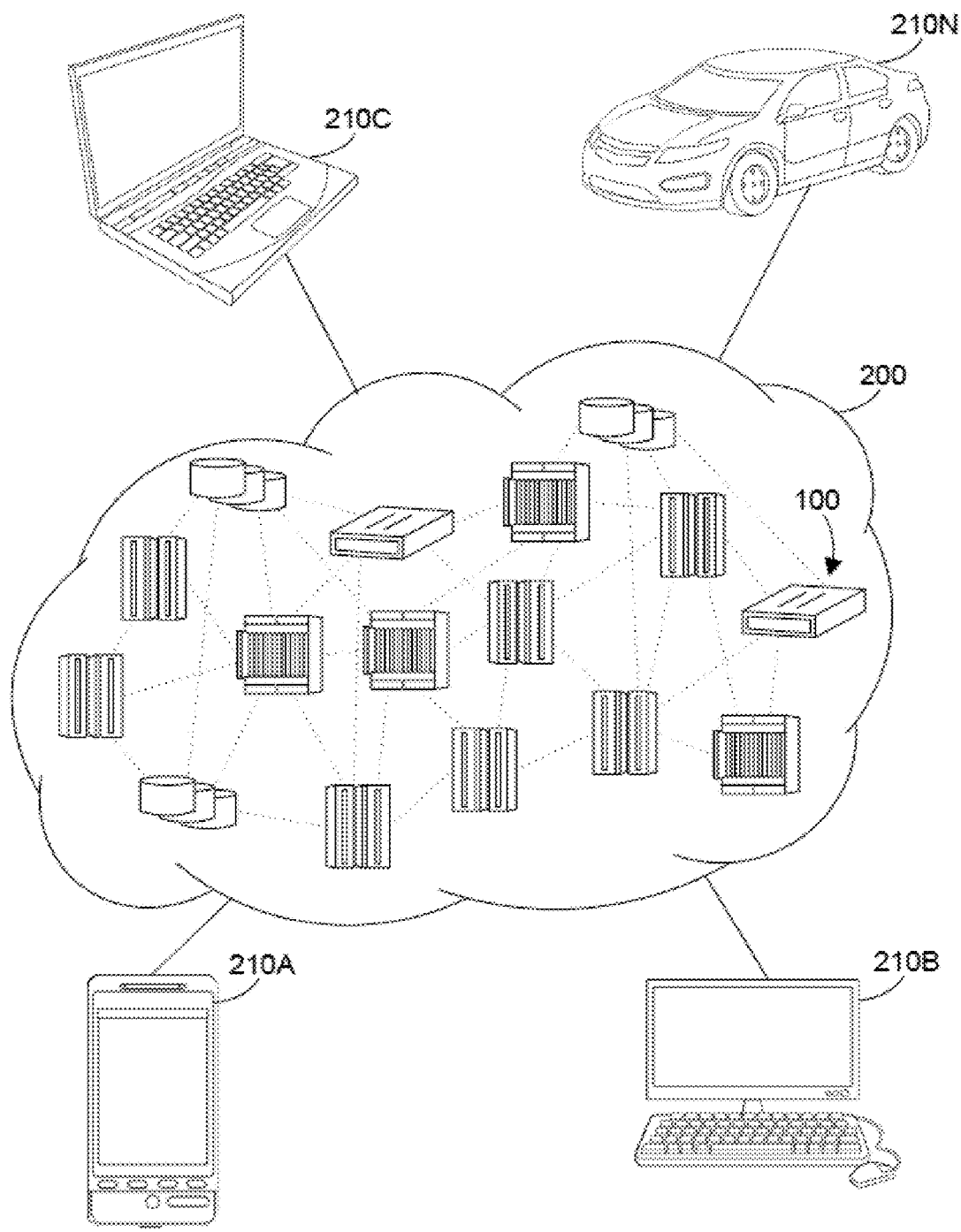
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
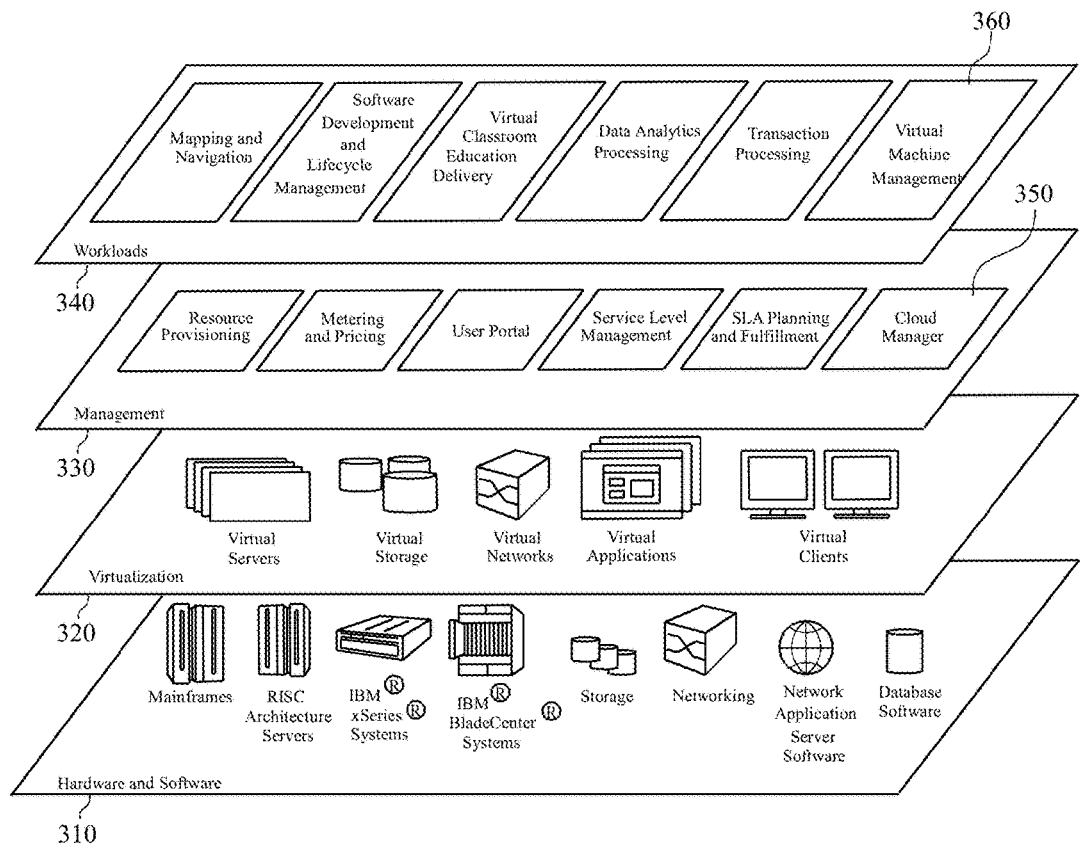
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and virtual machine management 360, which may be utilized as discussed in more detail below.

Figure 4:
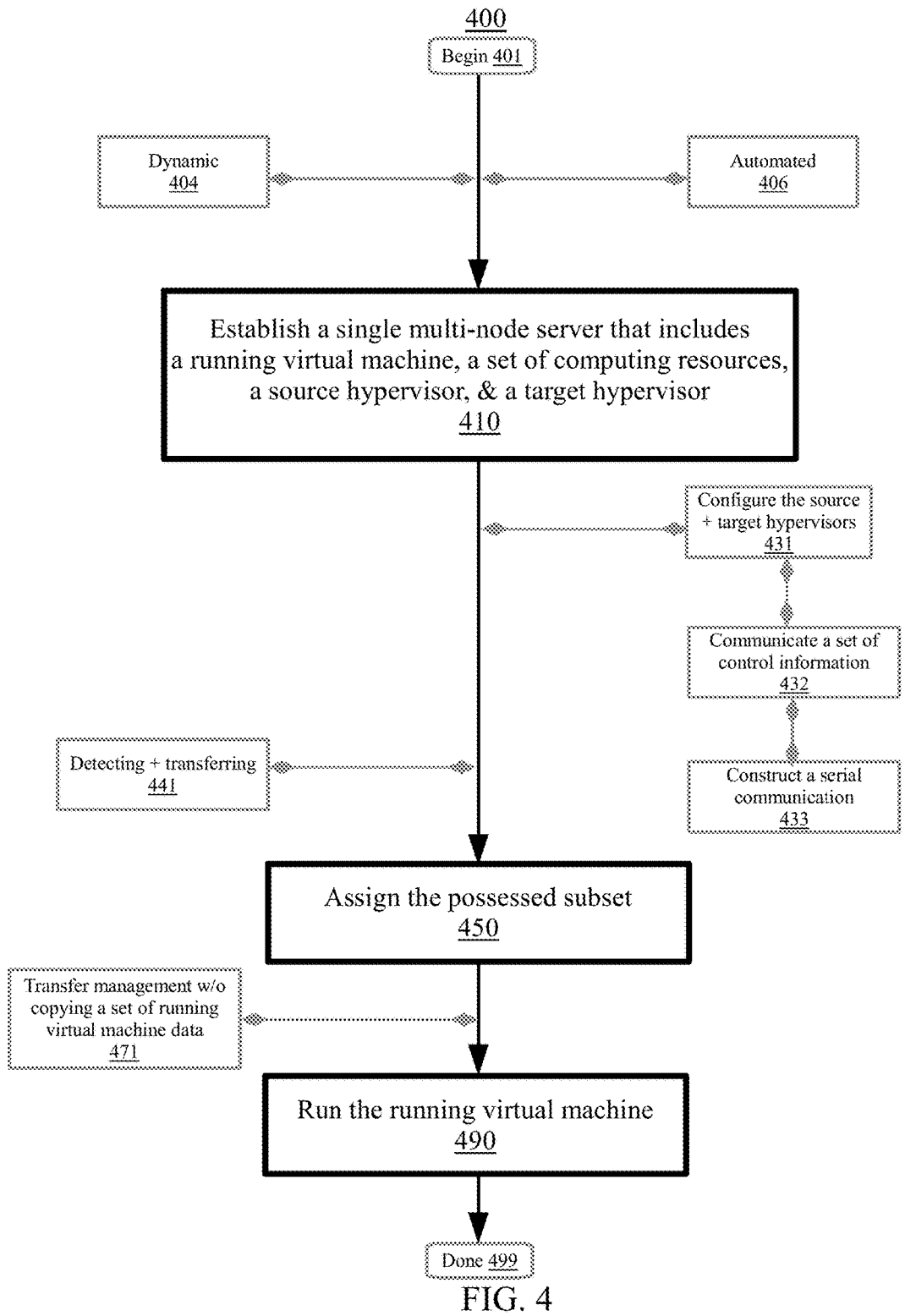
FIG. 4 is a flowchart illustrating a method for virtual machine management in a shared pool of configurable computing resources, according to embodiments.

FIG. 4 is a flowchart illustrating a method 400 for virtual machine management in a shared pool of configurable computing resources, according to embodiments. Aspects of method 400 relate to assigning a subset of computing resources for a running virtual machine from a source hypervisor to a target hypervisor. Hypervisors are one tool used to manage virtual machines on multi-node server environments. Some multi-node server environments support the use of multiple hypervisors, such that each hypervisor maintains control of separate groups of virtual machines. Aspects of the disclosure relate to the recognition that, in some situations, sharing resources for virtual machines between hypervisors on the same multi-node system may be associated with challenges such as virtual machine downtime, loss of efficiency, and migration constraints. Accordingly, aspects of the disclosure relate to mobilizing the virtual machines between hypervisors running on the same system such that the computing resources for a particular virtual machine running on a source hypervisor may be dynamically assigned to a target hypervisor. Dynamically assigning computing resources for a virtual machine from a source hypervisor to a target hypervisor may be performed without recreating/copying data from one hypervisor to another or migrating the virtual machine itself. As such, the need for moving/copying large amounts of data from one hypervisor to another may be avoided, facilitating resource-efficient sharing of virtual machine resources on a multi-node server having multiple hypervisors. Leveraging dynamic assignment of computing resources for a virtual machine from a source hypervisor to a target hypervisor may be associated with benefits including virtual machine mobility, workload consolidation, and computing resource management efficiency. The method 400 may begin at block 401.

In embodiments, the establishing, the assigning, the running, and the other steps described herein may each be performed in a dynamic fashion at block 404. The steps described herein may be performed in a dynamic fashion to streamline virtual machine management in the shared pool of configurable computing resources. For instance, the establishing, the assigning, the running, and the other steps described herein may occur in real-time, ongoing, or on-the-fly. As an example, one or more steps described herein may be performed on-the-fly (e.g., the possessed subset of the set of computing resources may be dynamically assigned from the source hypervisor to the target hypervisor, and the running virtual machine may be run using the target hypervisor in real-time) in order to streamline (e.g., facilitate, promote, enhance) virtual machine management in a shared pool of configurable computing resources. Other methods of performing the steps described herein are also possible.

In embodiments, the establishing, the assigning, the running, and the other steps described herein may each be performed in an automated fashion at block 406. The steps described herein may be performed in an automated fashion without user intervention. In embodiments, the establishing, the assigning, the running, and the other steps described herein may be carried out by an internal virtual machine management module maintained in a persistent storage device of a local computing device (e.g., network node, multi-node server). In embodiments, the establishing, the assigning, the running, and the other steps described herein may be carried out by an external virtual machine management module hosted by a remote computing device or server (e.g., server accessible via a subscription, usage-based, or other service model). In this way, aspects of virtual machine management may be performed using automated computing machinery without manual action. Other methods of performing the steps described herein are also possible.

At block 410, a single multi-node server may be established. The single multi-node server may include a running virtual machine, a set of computing resources that includes a possessed subset of the set of computing resources which is possessed by the running virtual machine, a source hypervisor which has the running virtual machine with respect to a first temporal period, and a target hypervisor to have the running virtual machine with respect to a second temporal period which is subsequent to the first temporal period. Generally, establishing can include building, arranging, assembling, setting-up, organizing, structuring, or otherwise configuring the single multi-node server. The single multi-node server may include a computing device or physical network node configured to provide functionality for other programs or devices (e.g., clients). The single multi-node server may be configured to provide various servers such as data/resource sharing functionality, computation operations, data storage/streaming functionality, or the like to one or more clients. As examples, the single multi-node server may include a database server, file server, mail server, print server, web server, game server, collaboration server, application server, or the like. In embodiments, the single-multi-node server may include a plurality of nodes. The nodes may include physical computing components, software modules, or virtualized computing environments for hosting assets (e.g., virtual machines, logical partitions) on the single multi-node server.

In embodiments, the single multi-node server may include a running virtual machine. The running virtual machine may include a virtualized operating system or application environment configured to emulate dedicated computer hardware that is in-operation (e.g., active, running) on one or more nodes of the single multi-node server. The running virtual machine may be configured to access system resources (e.g., memory, processor, Input/Output) of the single multi-node server in order to facilitate management and execution of computing workloads by the single multi-node server. As examples, the running virtual machine may include a system virtual machine, process virtual machine, virtual machine for data/operating system configuration backup, software testing, workload migration, workload consolidation, fault tolerance, or the like. In embodiments, the single multi-node server may include a set of computing resources. The set of computing resources may include physical, virtual, or logical components of limited availability within the single multi-node server. For instance, the set of computing resources may include central processing unit (CPU) usage, memory (e.g., random access memory, virtual memory), hard disk drive space, cache space, network throughput, electrical power, input/output (I/O) operations, external devices, or the like. In embodiments, the set of computing resources may include a possessed subset of the set of computing resources which is possessed by the running virtual machine. The possessed subset of the set of computing resources may include at least a portion of the set of computing resources that are allocated to the running virtual machine for utilization to manage and execute computing workloads. As an example, the possessed subset of the set of computing resources may include a portion of memory (e.g., 4 gigabytes), processor usage (e.g., 25%), and I/O communication channels (e.g., Channels 2-4) that are allocated for usage by the running virtual machine. Both/each of the source hypervisor and the target hypervisor may be capable of managing/controlling or configured to manage/control the possessed subset of the set of computing resources.

In embodiments, aspects of the disclosure relate to the recognition that a plurality of hypervisors may be used to manage the virtual machines hosted by the nodes of the single multi-node server. In embodiments, the single multi-node server may include a source hypervisor and a target hypervisor. Generally, the source and target hypervisors may include computer software modules (e.g., programs, applications, firmware) or hardware components to create and manage virtual machines on the single multi-node server. The source and target hypervisors may be configured to provide a virtual operating platform to facilitate sharing of virtualized hardware resources between virtual machines of the single multi-node server. In embodiments, both the source and target hypervisors may be configured to manage separate groups of nodes and virtual machines within the single multi-node server. As described herein, aspects of the disclosure relate to mobilizing virtual machines between the source and target hypervisors of the single multi-node server such that the computing resources for the running virtual machine on the source hypervisor may be dynamically assigned to the target hypervisor. In embodiments, the source hyper visor may be configured to manage the running virtual machine with respect to a first temporal period. The first temporal period may include a time frame, time duration, or point in time for which the source hyper visor maintains control of the running virtual machine (e.g., manages resources for the running virtual machine). For instance, the first temporal period may include a designated time frame of "3:00 PM to 6:00 PM." In embodiments, the target hypervisor may be configured to have the running virtual machine with respect to a second temporal period which is subsequent to the first temporal period. The second temporal period may include a time frame, time duration, or point in time for which the source hyper visor maintains control of the running virtual machine (e.g., manages resources for the running virtual machine). As described herein, the second temporal period may be subsequent to (e.g., after, following, ensuing, chronologically successive to) the first temporal period. As an example, the second temporal period may include a time frame of "6:00 PM to 9:00 PM." In embodiments, establishing the single multi-node server may include deploying the running virtual machine to a node of the multi-node server that is managed by the source hypervisor, and allocating a portion of the set of computing resources of the single multi-node server for use by the running virtual machine. Other methods of establishing the single multi-node server that includes the running virtual machine, the set of computing resources that includes the possessed subset of the set of computing resources, the source hypervisor, and the target hypervisor are also possible.

In embodiments, both the source and target hypervisors may be configured using a single service processor at block 431. Generally, configuring can include arranging, setting-up, building, organizing, assembling, or otherwise structuring the source and target hypervisors using the single service processor. As described herein, aspects of the disclosure relate to managing virtual machines using a plurality of hypervisors on a single multi-node server. Accordingly, in embodiments, aspects of the disclosure relate to using a single service processor to configure the plurality of hypervisors (e.g., the source hypervisor and the target hypervisor). In embodiments, the single service processor may include a collection of computer hardware components and software modules configured to provide management functions with respect to the physical and logical topology of the single multi-node server. For instance, the single service processor may monitor the system temperature, voltages, currents, and fan speeds of hardware components of the single multi-node server, track the system resources used by each virtual machine, and facilitate communication between nodes of the single multi-node server. In embodiments, configuring the source and target hypervisors using the single service processor may include establishing a logical topology for the single multi-node server that includes a first logical domain for the source hypervisor and a second logical domain for the target hypervisor. The first and second logical domains may include regions, areas, districts, or territories of the logical topology for the single multi-node server that designate nodes, virtual machines, logical partitions, and system resources for management by a particular hypervisor. For instance, configuring may include using the service processor to define a first logical domain for the first hypervisor that includes a first node and a second node that each host four virtual machines, and a second logical domain for the target hypervisor that includes a third node and a fourth node that each host three virtual machines. Other methods of configuring both the source and target hypervisors using the single service processor are also possible.

In embodiments, a set of scheduling-related control information for the running virtual machine may be communicated at block 432. The set of scheduling-related control information may be communicated via the single service processor. The set of scheduling-related control information may be communicated from the source hypervisor to the target hypervisor. Generally, communicating can include conveying, sending, relaying, transferring, directing, transmitting, or otherwise routing the set of scheduling-related control information for the running virtual machine from the source hypervisor to the target hypervisor via the single service processor. The scheduling-related control information may include a collection of data that indicates the nature, order, and timing of workload activity for the running virtual machine. The scheduling-related information may indicate when the virtual machine performs particular tasks (e.g., every day at 4:00 PM, in response to a particular triggering event), the duration of each task (e.g., 2-4 minutes, until a measured value achieves a threshold), the amount of resources used by each task (e.g., 2 gigabytes of memory, 18% CPU usage), the frequency with which particular tasks are performed (e.g., 10-12 times per day), the degree of importance of each task (e.g., high importance, low importance), the sequence of tasks (e.g., a first task occurs before a second task; whether sequence is important) and other information that characterizes the workload activity for the running virtual machine. As described herein, the set of scheduling-related control information may be communicated via the single service processor. For instance, in embodiments, the single service processor may query the source hypervisor to collect the set of scheduling-related control information for the running virtual machine (e.g., the information may be monitored and aggregated by the source hypervisor during usage of the running virtual machine), and transmitted to the target hypervisor. As such, the target hypervisor may utilize the set of scheduling-related control information for the running virtual machine to modify one or more nodes or virtual machines (e.g., manage system resource allocations, adjust task schedules) to accommodate the running virtual machine. Other methods of communicating the set of scheduling-related control information for the running virtual machine are also possible.

In embodiments, a serial communication between the source and target hypervisors may be constructed at block 433. The constructing may be performed by the single service processor. The serial communication may be constructed to send the set of scheduling-related control information for the running virtual machine from the source hypervisor to the target hypervisor when transferring the running virtual machine from the source hypervisor to the target hypervisor. Generally, constructing can include assembling, building, composing, creating, structuring, or otherwise establishing the serial communication between the source and target hypervisors by the single service processor. The serial communication may include a computer bus, communication channel, or other communication interface between the source and target hypervisors configured to transmit data one bit at a time in a sequential fashion between the source and target hypervisors. In embodiments, constructing the serial communication may include using the single service processor to designate a serial bus of the single multi-node server for two-way serial communication between the source hypervisor and the target hypervisor. As described herein, the serial communication may be constructed to send the set of scheduling-related control information for the running virtual machine from the source hypervisor to the target hypervisor. For instance, in embodiments, the single service processor may detect that the possessed subset of computing resources are scheduled for reassignment from the source hypervisor to the target hypervisor, and prompt the source hypervisor to transmit the set of scheduling-related control information for the running virtual machine to the target hypervisor at substantially the same time (e.g., in synchronization with, simultaneously, within a temporal threshold) as the reassignment of the possessed subset of computing resources (e.g., transfer of the running virtual machine). Other methods of constructing the serial communication between the source hypervisor and the target hypervisor are also possible.

In embodiments, detecting and transferring may occur at block 441. It may be detected that the running virtual machine is running across a plurality of nodes of the single multi-node server. Aspects of the disclosure relate to the recognition that in some situations, the running virtual machine may be utilized by a plurality of nodes of the single multi-node server (e.g., the possessed subset of computing resources are spread out over multiple nodes/used by tasks of multiple nodes). Accordingly, in embodiments, aspects of the disclosure relate to detecting that the running virtual machine is running across multiple nodes, and transferring assignment of the possessed subset of computing resources from the source hypervisor to the target hypervisor. Generally, detecting can include sensing, recognizing, discovering, identifying, or otherwise ascertaining that the running virtual machine is running across multiple nodes. In embodiments, detecting may include utilizing the single service processor to perform a resource usage diagnostic with respect to the running virtual machine, and ascertaining that the possessed subset of computing resources is in utilization by tasks on multiple of nodes of the single multi-node server. For instance, it may be detected that a first portion of the possessed subset of computing resources are in use for a software debugging operation on a first node, and a second portion of the possessed subset of computing resources are in use for an operating system repair operation on a second node. In embodiments, assignment of the possessed subset of the set of computing resources may be transferred to the target hypervisor from the source hypervisor. Generally, transferring can include relocating, moving, delivering, or otherwise passing assignment of the possessed subset of the set of computing resources from the source hypervisor to the target hypervisor. In embodiments, transferring may include gathering or aggregating the possessed subset of the set of computing resources from the plurality of nodes on a single node, and subsequently relocating the possessed subset of computing resources from the source hypervisor to the target hypervisor. For instance, the single service processor may identify a set of operations (e.g., tasks, activities) running across a plurality of nodes of the source hypervisor that utilize a portion of the possessed subset of the set of computing resources, and terminate the set of operations (e.g., instruct the plurality of nodes to cease usage of the possessed subset of computing resources) to enable transfer of the possessed subset of computing resources to the target hypervisor. Other methods of detecting that the running virtual machine is running across the plurality of nodes of the single multi-node server and transferring assignment of the possessed subset of computing resources from the source hypervisor to the target hypervisor are also possible.

At block 450, the possessed subset of the set of computing resources may be assigned to the target hypervisor from the source hypervisor. The possessed subset of set of computing resources may be possessed by the running virtual machine. Generally, assigning can include relegating, ceding, handing-over, allotting, or otherwise allocating the possessed subset of the set of computing resources from the source hypervisor to the target hypervisor. In embodiments, assigning may include passing control of the possessed subset of the set of computing resources from the source hypervisor to the target hypervisor. Assigning the possessed subset of the set of computing resources from the source hypervisor to the target hypervisor may provide the target hypervisor with authorization to govern the resource allocation decisions (e.g., amount of the possessed subset that is made available to the running virtual machine and other virtual machines), workload/task deployments (e.g., tasks that may make use of the possessed subset of computing resources), resource sharing permissions (e.g., what nodes and virtual machines may utilize the possessed subset of computing resources), and other management decisions with respect to the possessed subset of computing resources. In embodiments, assigning the possessed subset of the set of computing resources may include utilizing the service processor to modify a virtual machine resource allocation database for the single multi-node server by changing a resource manager registration for the possessed subset of the set of computing resources from the source hypervisor to the target hypervisor (e.g., to cede management control of the possessed subset from the source hypervisor to the target hypervisor). In embodiments, assigning the possessed subset of the set of computing resources may include defining (e.g., re-defining) the logical topology of the single multi-node server such that a logical domain of the target hypervisor is expanded to include (e.g., consume) a set of logical partitions (LPARS) that correspond to the possessed subset of the set of computing resources. For instance, the service processor may instruct the source hypervisor to relinquish control of the possessed subset of the set of computing resources, stitch the possessed subset into the logical domain (e.g., pool of resources) of the target hypervisor, and instruct the target hypervisor to take control of the possessed subset of the set of computing resources. Other methods of assigning the possessed subset of the set of computing resources from the source hypervisor to the target hypervisor are also possible.

In embodiments, management of the running virtual machine may be transferred at block 471. Management may be transferred to the target hypervisor from the source hypervisor. The transferring may occur without copying a set of running virtual machine data from a set of memory regions. Generally, transferring can include relocating, moving, delivering, transmitting, passing, or otherwise ceding management of the running virtual machine without copying a set of running virtual machine data from a set of memory regions. The set of memory regions may include physical or virtual memory addresses of the single multi-node server that are allocated for use by the running virtual machine. The set of memory regions may be configured to store a set of running virtual machine data. The set of running virtual machine data may include a collection of information used by or corresponding to the running virtual machine. For instance, the set of running virtual machine data may include an operating system image used by the running virtual machine together with application data for tasks and operations executed by the running virtual machine. In embodiments, transferring may include re-allocating ownership (e.g., control) of the processor, memory, and I/O resources (e.g., possessed subset of the set of computing resources) belonging to the running virtual machine from the source hypervisor to the target hypervisor without copying the set of running virtual machine data from the set of memory regions. As an example, consider a subset of nodes managed by the source hypervisor of the single multi-node server. The subset of nodes may host the running virtual machine. In embodiments, transferring may include using the service processor to configure the inter- and intra-node buses of the subset of nodes to delink the subset of nodes from the source hypervisor and re-link them to the target hypervisor. In this way, the target hypervisor may assume control of the running virtual machine without moving/copying the set of running virtual machine data from the set of memory regions. Other methods of transferring management of the running virtual machine from the source hypervisor to the target hypervisor without copying a set of running virtual machine data are also possible.

At block 490, the running virtual machine may be run using the target hypervisor. Generally, running can include performing, implementing, utilizing, executing, managing, or otherwise operating the running virtual machine using the target hypervisor. In embodiments, running the running virtual machine may include using the target hypervisor to facilitate maintenance and performance of the tasks, workloads, and operations of the running virtual machine. For instance, the target hypervisor may allocate resources (e.g., of the possessed subset of the set of computing resources) for task performance, maintain operational isolation (e.g., prevent other virtual machines from affecting/impacting performance of the running virtual machine), provide a virtual operating platform, supply para-virtualized drivers (e.g., operating system specific drivers for emulating hardware components), manage sharing permissions, configure Input/Output communication channels, and perform other tasks with respect to the running virtual machine. In embodiments, running the running virtual machine may include using the target hypervisor to configure an operational schedule for the running virtual machine. As an example, the target hypervisor may examine a set of scheduling-related control information for the running machine with respect to operational schedules for other virtual machines managed by the target hypervisor, and formulate an operational schedule for the running virtual machine by assigning designated time periods and resource allotments for a set of workload operations of the running virtual machine (e.g., such that the running virtual machine may continue uninterrupted performance of workload operations without interfering with other virtual machines of the single multi-node server). Other methods of running the running virtual machine using the target hypervisor are also possible.

Consider the following example. A single multi-node server may include a source hypervisor and a target hypervisor. The source hypervisor may maintain a first node and a second node each hosting four virtual machines. The target hypervisor may maintain a third node and a fourth node also each having four virtual machines. In embodiments, the first node of the source hypervisor may include a running virtual machine associated with a possessed subset of the set of computing resources. As described herein, aspects of the disclosure relate to assigning a subset of computing resources for a running virtual machine from the source hypervisor to the target hypervisor. In embodiments, assigning may include utilizing the service processor to instruct the source hypervisor to relinquish control of the running virtual machine as well as the possessed subset of the set of computing resources for the running virtual machine. In response to detecting that control of the running virtual machine has been released by the source hypervisor, the service processor may reconfigure inter/intra-node communication channels for the first node and the third node in order to stitch the running virtual machine into the logical domain of the target hypervisor as well as add the possessed subset of the set of computing resources to the to the pool of resources of the target hypervisor. The service processor may then instruct the target hypervisor to assume control of the running virtual machine and and run the running virtual machine within the logical domain of the target hypervisor using the possessed subset of computing resources. As such, control of the running virtual machine and the possessed subset of computing resources may be transferred to the target hypervisor without the moving/copying of data for the running virtual machine. Other methods of virtual machine management in a shared pool of configurable computing resources are also possible.

Method 400 concludes at block 499. Aspects of method 400 may provide performance or efficiency benefits related to virtual machine management. Aspects may save resources such as bandwidth, processing, or memory. As an example, dynamically assigning the possessed subset of the set of computing resources from the source hypervisor to the target hypervisor may facilitate virtual machine mobility and avoid virtual machine migration operations, saving time and system resources. Altogether, leveraging dynamic assignment of computing resources for a virtual machine from a source hypervisor to a target hypervisor may be associated with benefits including virtual machine mobility, workload consolidation, and computing resource management efficiency.

Figure 5:
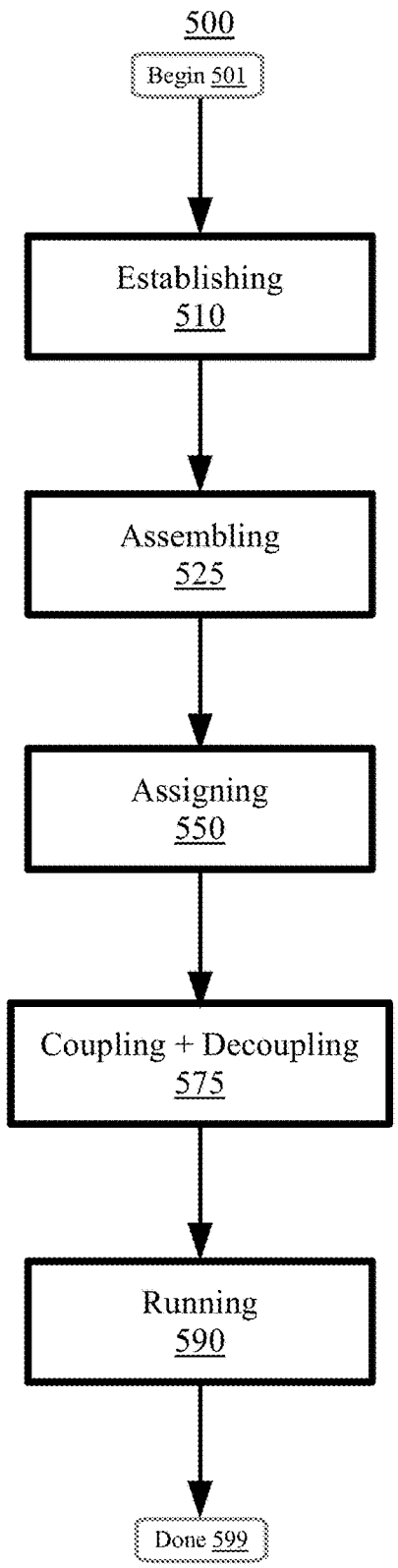
FIG. 5 is a flowchart illustrating a method for virtual machine management in a shared pool of configurable computing resources, according to embodiments.

FIG. 5 is a flowchart illustrating a method 500 for virtual machine management in a shared pool of configurable computing resources, according to embodiments. Aspects of method 500 relate to assembling a set of memory regions of a segment of a node of the source hypervisor, coupling the set of memory regions of the segment of the node to the target hypervisor, and decoupling the source hypervisor from the set of memory regions of the segment of the node. Aspects of the disclosure, in embodiments, relate to transferring control of the running virtual machine from the source hypervisor to the target hypervisor by re-defining node boundaries for nodes of the single multi-node server (e.g., migrating memory regions of the running virtual machine to the edge of a node belonging to the source hypervisor so that the ownership of the possessed subset of computing resources may be transferred to the target hypervisor). Aspects of method 500 may be similar or the same as aspects of 400, and aspects may be utilized interchangeably. The method 500 may begin at block 501.

At block 510, a single multi-node server may be established. The single multi-node server may include a running virtual machine, a set of computing resources that includes a possessed subset of the set of computing resources which is possessed by the running virtual machine, a source hypervisor which has the running virtual machine with respect to a first temporal period, and a target hypervisor to have the running virtual machine with respect to a second temporal period which is subsequent to the first temporal period. In embodiments, establishing the single multi-node server may include deploying the running virtual machine to a node of the multi-node server that is managed by the source hypervisor, and allocating a portion of the set of computing resources of the single multi-node server for use by the running virtual machine. Other methods of establishing the single multi-node server that includes the running virtual machine, the set of computing resources that includes the possessed subset of the set of computing resources, the source hypervisor, and the target hypervisor are also possible.

At block 525, a set of memory regions of a segment of a node coupled with the source hypervisor may be assembled. The assembling may be performed with respect to the first temporal period. Generally, assembling can include arranging, gathering, grouping, aggregating, collecting, structuring, or otherwise organizing the set of memory regions of the segment of the node. The set of memory regions may include physical or virtual memory addresses of the single multi-node server that are allocated for use by the running virtual machine (e.g., for storage of a set of running virtual machine data). The segment of the node may include a part, portion, division, partition, or section of a node coupled with (e.g., linked with, managed by, controlled by) the source hypervisor. In embodiments, the segment of the node may include a boundary region (e.g., edge; area of the node configured to interface/communicate with other nodes/hypervisors) of the source hypervisor. In embodiments, assembling the set of memory regions may include consolidating memory resources for the running virtual machine (e.g., sets of running virtual machine data) together on the segment of the node. For instance, assembling may include transferring (e.g., migrating) portions of the set of running virtual machine data from a plurality of memory regions of different nodes of the single multi-node server to a single node segment that is associated with a logical domain boundary of the source hypervisor (e.g., an "edge" node of the source hypervisor; node that maintains physical connections with one or more nodes of the target hypervisor). In embodiments, the set of memory regions may be assembled with respect to the first temporal period. For instance, in embodiments, the set of memory regions may be assembled while the running virtual machine is under management by the source hypervisor. Other methods of assembling the set of memory regions of the segment of the node coupled with the source hypervisor are also possible.

At block 550, the possessed subset of the set of computing resources may be assigned to the target hypervisor from the source hypervisor. The possessed subset of set of computing resources may be possessed by the running virtual machine. Generally, assigning can include relegating, ceding, handing-over, allotting, or otherwise allocating the possessed subset of the set of computing resources from the source hypervisor to the target hypervisor. In embodiments, assigning may include passing control of the possessed subset of the set of computing resources from the source hypervisor to the target hypervisor. Other methods of assigning the possessed subset of the set of computing resources from the source hypervisor to the target hypervisor are also possible.

At block 575, coupling and decoupling may occur. Aspects of the disclosure, in embodiments, relate to using a single service processor to configure communication links between nodes of the source hypervisor and nodes of the target hypervisor to facilitate dynamic assignment of the running virtual machine and the subset of the set of computing resources to the target hypervisor. In embodiments, the target hypervisor may be coupled with the set of memory regions of the segment of the node. The coupling may be performed with respect to the second temporal period. Generally, coupling can include linking, associating, pairing, joining, or otherwise connecting the target hypervisor with the set of memory regions of the segment of the node. In embodiments, coupling may include utilizing the single service processor to establish communication connections between the segment of the node managed by the source hypervisor (e.g., on which the set of memory regions are assembled) and one or more nodes managed by the target hypervisor. For instance, coupling may include using the service processor to establish intra-node symmetric multiprocessing (SMP) buses between the set of memory regions of the segment of the node and one or more nodes of the target hypervisor with respect to the second temporal period (e.g., when control of the running virtual machine has been transferred to the target hypervisor). As such, the target hypervisor may expand to include (e.g., consume) the set of memory regions for the running virtual machine. In embodiments, the source hypervisor may be decoupled with the set of memory regions of the segment of the node. The decoupling may be performed with respect to the second temporal period. Generally, decoupling can include detaching, cutting-off, separating, disassociating, disjoining, disengaging, severing, or otherwise detaching the source hypervisor with the set of memory regions of the segment of the node. In embodiments, decoupling may include utilizing the single service processor to remove the communication connections between the set of memory regions of the segment of the node and the source hypervisor. For instance, decoupling may include using the service processor to disable (e.g., invalidate) one or more SMP buses between the set of memory regions of the segment of the node and one or more nodes of the source hypervisor with respect to the second temporal period (e.g., when control of the running virtual machine has been transferred to the target hypervisor). As such, the set of memory regions for the running virtual machine may be transferred to the control of the target hypervisor (e.g., without moving/copying of data between hypervisors) to facilitate utilization of the running virtual machine by the target hypervisor. Other methods of coupling the target hypervisor with the set of memory regions of the segment of the node and decoupling the source hypervisor with the set of memory regions of the segment of the node are also possible.

At block 590, the running virtual machine may be run using the target hypervisor. Generally, running can include performing, implementing, utilizing, executing, managing, or otherwise operating the running virtual machine using the target hypervisor. In embodiments, running the running virtual machine may include using the target hypervisor to facilitate maintenance and performance of the tasks, workloads, and operations of the running virtual machine.

Method 500 concludes at block 599. Aspects of method 500 may provide performance or efficiency benefits related to virtual machine management. Aspects may save resources such as bandwidth, processing, or memory. Altogether, leveraging dynamic assignment of computing resources for a virtual machine from a source hypervisor to a target hypervisor may be associated with benefits including virtual machine mobility, workload consolidation, and computing resource management efficiency.

Figure 6:
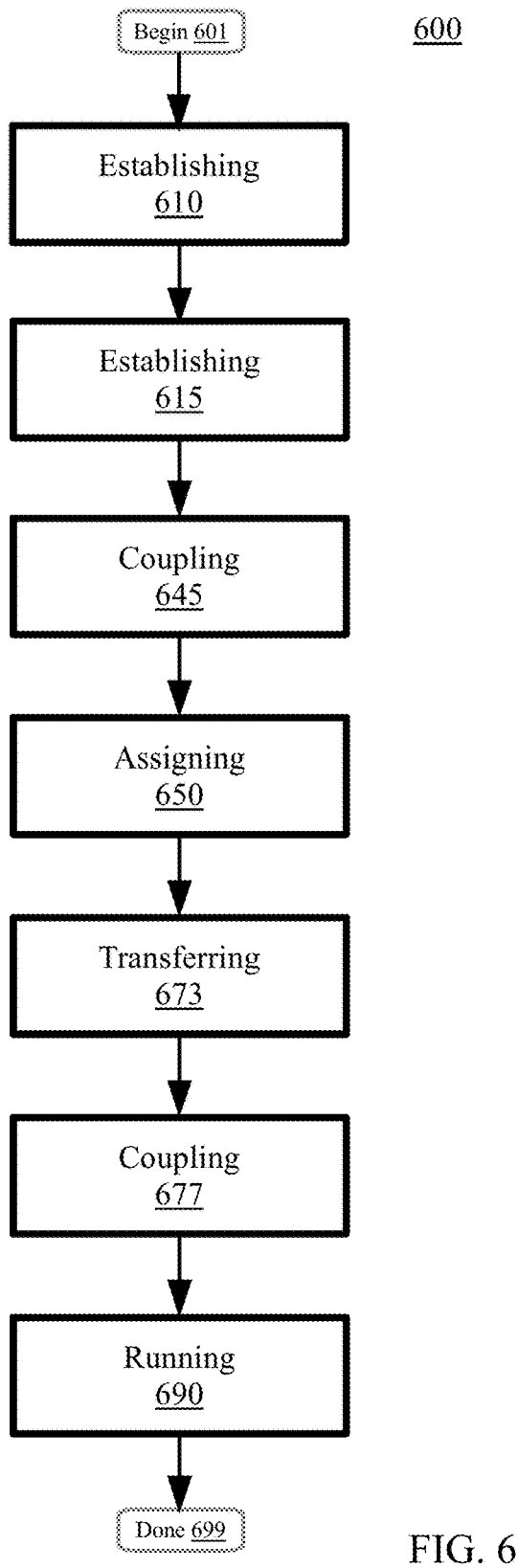
FIG. 6 is a flowchart illustrating a method for virtual machine management in a shared pool of configurable computing resources, according to embodiments.

FIG. 6 is a flowchart illustrating a method 600 for virtual machine management in a shared pool of configurable computing resources, according to embodiments. Aspects of method 600 relate to the recognition that, in some situations, it may be desirable to maintain a portion of the computing resources for a particular virtual machine under the control of the source hypervisor when dynamically assigning the virtual machine to the target hypervisor. Accordingly, aspects of the disclosure relate to transferring one or more elements of a subset of computing resources for a virtual machine from a first node to a second node that is coupled with the source hypervisor, and subsequently coupling the first node with the target hypervisor (e.g., such that a portion of the computing resources may remain under the control of the source hypervisor). Aspects of method 600 may be similar or the same as aspects of 400/500, and aspects may be utilized interchangeably. The method 600 may begin at block 601.

At block 610, a single multi-node server may be established. The single multi-node server may include a running virtual machine, a set of computing resources that includes a possessed subset of the set of computing resources which is possessed by the running virtual machine, a source hypervisor which has the running virtual machine with respect to a first temporal period, and a target hypervisor to have the running virtual machine with respect to a second temporal period which is subsequent to the first temporal period.

At block 615, the single multi-node server may be established. Generally, establishing can include building, arranging, assembling, setting-up, organizing, structuring, or otherwise configuring the single multi-node server. The single multi-node server may include a different virtual machine. The different virtual machine may include a virtualized operating system or application environment configured to emulate dedicated computer hardware that is in-operation (e.g., active, running) on one or more nodes of the single multi-node server. The different virtual machine may be a separate virtual machine than the running virtual machine. In embodiments, the single multi-node server may include a first node. The first node may include a hardware unit configured with a processor, memory, and internally and externally connected I/O devices. As examples, the first node may include one or more computing devices (e.g., personal computers, cell phones), data communication equipment (e.g., modem, hub, bridge, switch), data terminal equipment (e.g., digital telephone handset, printer), host computer (e.g., router, workstation, other network device identified by an Internet Protocol address), or the like. The first node may have a set of computing resources that includes a different subset of the set of computing resources which is possessed by the different virtual machine with respect to the first temporal period. As described herein, the set of computing resources may include central processing unit (CPU) usage, memory (e.g., random access memory, virtual memory), hard disk drive space, cache space, network throughput, electrical power, input/output (I/O) operations, external devices, or the like. The different subset of the set of computing resources may include a portion of the set of computing resources that are allocated to the different virtual machine for utilization to manage and execute computing workloads. In embodiments, the different subset of the set of computing resources may differ from (e.g., not overlap with, be mutually exclusive with respect to) the possessed subset of the set of computing resources corresponding to the running virtual machine. As described herein, the single multi-node server may include a source hypervisor and a target hypervisor. Generally, the source and target hypervisors may include computer software modules (e.g., programs, applications, firmware) or hardware components to create and manage virtual machines on the single multi-node server. The source hypervisor may be configured to manage the different virtual machine with respect to both the first and second temporal periods (e.g., the source hypervisor may maintain control of at least a portion of the different subset of computing resources for the different virtual machine for both the first and second temporal periods). The target hypervisor may be configured to manage the different virtual machine with respect to the second temporal period (e.g., after the first node has been coupled with the target hypervisor). Other methods of establishing the single multi-node server are also possible.

At block 645, the first node may be coupled with the source hypervisor. The coupling may be performed with respect to the first temporal period. Aspects of the disclosure, in embodiments, relate to dynamically assigning computing resources for a virtual machine from a source hypervisor to a target hypervisor by managing communication connections (e.g., SMP bus links) between nodes. Accordingly, in embodiments, the first node having the set of computing resources may be coupled with the source hypervisor. Generally, coupling can include linking, associating, pairing, joining, or otherwise connecting the first node with the source hypervisor. In embodiments, coupling may include utilizing the single service processor to establish communication connections between the first node and the source hypervisor. For instance, coupling may include using the service processor to establish one or more SMP buses between the first node and the source hypervisor. In embodiments, coupling may include modifying the logical topography of the single multi-node server to include (e.g., add) the first node into the logical domain regulated by the source hypervisor. As such, the set of computing resources including the different subset of computing resources possessed by the different virtual machine may be placed under control/management of the source hypervisor. As described herein, coupling the first node with the source hypervisor may occur with respect to the first temporal period. For instance, the first node may be coupled with the source hypervisor during a designated time window of 8:20 PM-8:30 PM. Other methods of coupling the first node with the source hypervisor with respect to the first temporal period are also possible.

At block 650, the possessed subset of the set of computing resources may be assigned to the target hypervisor from the source hypervisor. The possessed subset of set of computing resources may be possessed by the running virtual machine. Generally, assigning can include relegating, ceding, handing-over, allotting, or otherwise allocating the possessed subset of the set of computing resources from the source hypervisor to the target hypervisor. In embodiments, assigning may include passing control of the possessed subset of the set of computing resources from the source hypervisor to the target hypervisor. Other methods of assigning the possessed subset of the set of computing resources to the target hypervisor from the source hypervisor are also possible.

At block 673, one or more elements of the different subset of the set of computing resources which is possessed by the different virtual machine may be transferred. The elements may be transferred from the first node to a second node which is coupled with the source hypervisor. As described herein, aspects of the disclosure relate to the recognition that in some situations it may be desirable to maintain a portion of the different subset of the set of computing resources under the control of the source hypervisor when assigning the different virtual machine to the target hypervisor. Accordingly, aspects of the disclosure relate to transferring one or more elements of the different subset of the set of computing resources to a second node that is coupled with the source hypervisor (e.g., such that the source hypervisor may maintain control of a portion of the different subset of computing resources). Generally, transferring can include relocating, moving, delivering, deploying, or otherwise allocating one or more elements of the different subset of the set of computing resources from the first node to the second node. The second node may include a hardware unit configured with a processor, memory, and internally and externally connected I/O devices. The second node may be coupled with the source hypervisor (e.g., be controlled/managed by the source hypervisor). The second node may differ from the first node (e.g., be physically or logically separate from the first node). The one or more elements of the different subset of the set of computing resources may include portions of the different subset of the set of computing resources (e.g., computing resources corresponding to the different virtual machine). For instance, the one or more elements may include memory (e.g., memory regions, memory locations, memory allocation), data (e.g., application files, historical usage data), records (e.g., data entries, usage logs), or the like. In embodiments, transferring may include migrating the one or more elements of the different subset from the first node to the second node using a communication connection (e.g., SMP bus). In certain embodiments, transferring may include receiving a request from the second node for the one or more elements of the different subset, and instructing the first node to transmit the one or more elements to a designated network address corresponding to the second node. In certain embodiments, transferring may include utilizing the single service processor to examine the system configuration of a plurality of nodes managed by the source hypervisor, and ascertaining that the second node achieves a suitability threshold with respect to the one or more elements. Accordingly, the one or more elements of the different subset may be migrated to the second node. Other methods of transferring the one or more elements of the different subset of the set of computing resources from the first node to the second node which is coupled with the source hypervisor are also possible.

At block 677, the first node may be coupled with the target hypervisor. The coupling may be performed with respect to the second temporal period. Aspects of the disclosure relate to the recognition that, in certain embodiments, after the one or more elements of the different subset of the set of computing resources have been relocated to a second node coupled with the source hypervisor (e.g., to maintain control/management of the one or more elements by the source hypervisor), the first node may be coupled with the target hypervisor (e.g., to facilitate virtual machine mobility and dynamic assignment of resources between hypervisors). Generally, coupling can include linking, associating, pairing, joining, or otherwise connecting the first node with the target hypervisor. In embodiments, coupling may include utilizing the single service processor to establish communication connections between the first node and the target hypervisor. For instance, coupling may include using the service processor to establish one or more SMP buses between the first node and the target hypervisor. In embodiments, coupling may include modifying the logical topography of the single multi-node server to shift (e.g., relocate) the first node to the logical domain regulated by the target hypervisor. As such, the remainder of the set of computing resources (e.g., including the different subset of computing resources possessed by the different virtual machine) may be placed under control/management of the target hypervisor, while the one or more elements of the different subset of the set of computing resources may remain under the management of the source hypervisor. As described herein, coupling the first node with the target hypervisor may occur with respect to the second temporal period. For instance, the first node may be coupled with the target hypervisor during a designated time window of 8:35 PM-8:45 PM (e.g., a temporal period subsequent to the first temporal period). Other methods of coupling the first node with the target hypervisor with respect to the second temporal period are also possible.

At block 690, the running virtual machine may be run using the target hypervisor. Generally, running can include performing, implementing, utilizing, executing, managing, or otherwise operating the running virtual machine using the target hypervisor. In embodiments, running the running virtual machine may include using the target hypervisor to facilitate maintenance and performance of the tasks, workloads, and operations of the running virtual machine. In embodiments, running may include operating the different virtual machine using the target hypervisor. Other methods of running the running virtual machine or the different virtual machine using the target hypervisor are also possible.

Method 600 concludes at block 699. Aspects of method 600 may provide performance or efficiency benefits related to virtual machine management. Aspects may save resources such as bandwidth, processing, or memory. Altogether, leveraging dynamic assignment of computing resources for a virtual machine from a source hypervisor to a target hypervisor may be associated with benefits including virtual machine mobility, workload consolidation, and computing resource management efficiency.

Figure 7:
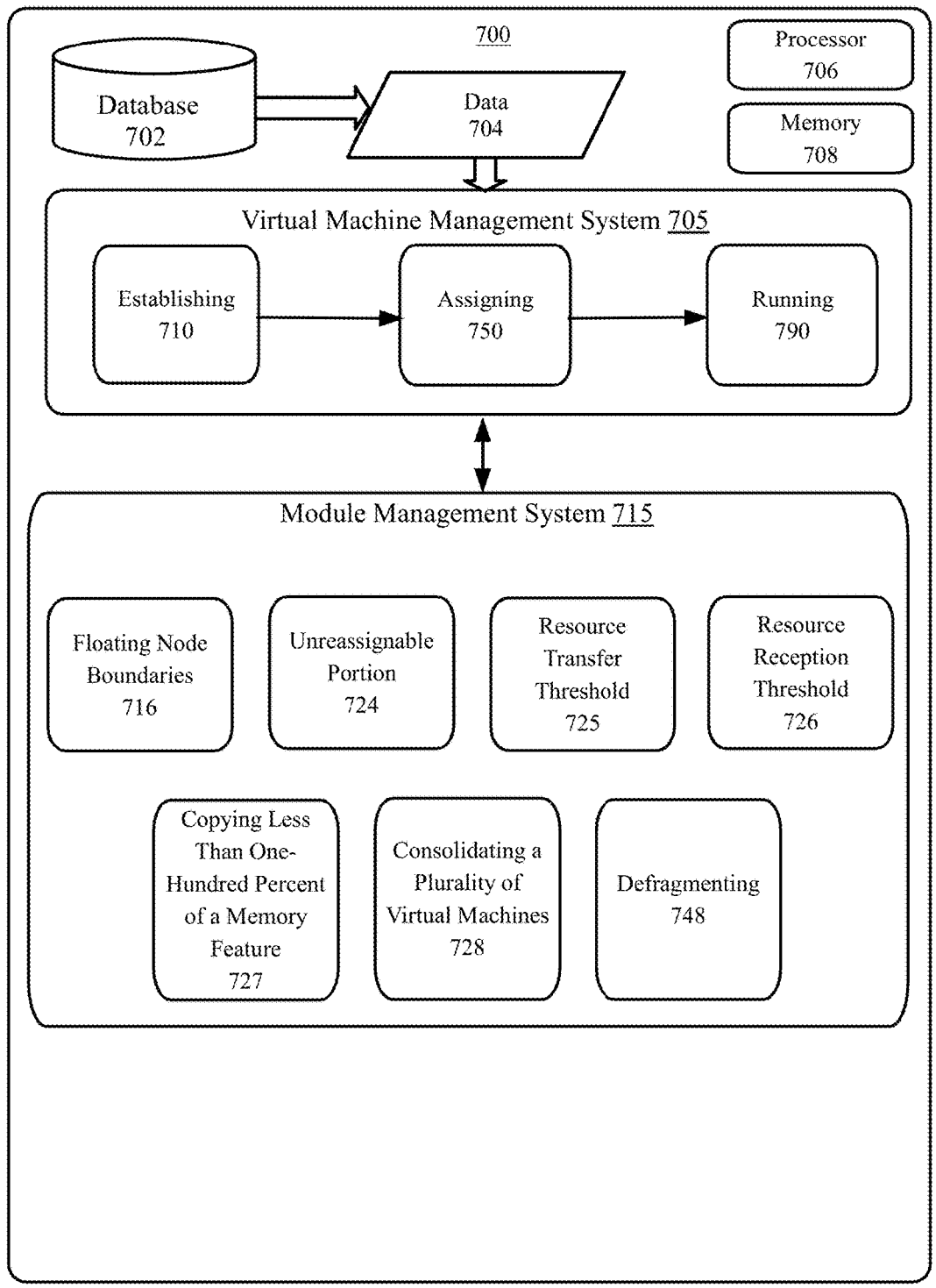
FIG. 7 shows an example system for virtual machine management in a shared pool of configurable computing resources, according to embodiments.

FIG. 7 shows an example system 700 for virtual machine management with respect to a shared pool of configurable computing resources. The example system 700 may include a processor 706 and a memory 708 to facilitate implementation of virtual machine management techniques. The example system 700 include a database 702 configured to maintain data and information. In embodiments, the example system 700 may include a virtual machine management system 705. The virtual machine management system 705 may be communicatively connected to the database 702, and be configured to receive data 704. The virtual machine management system 705 may include an establishing module 710 to establish a single multi-node server, an assigning module 750 to assign the possessed subset to the target hypervisor, and a running module 790 to run the running virtual machine. The virtual machine management system 705 may be communicatively connected with a module management system 715 that includes one or more modules for implementing aspects of virtual machine management.

In embodiments, a set of floating node boundaries may be configured at module 716. The configuring may be performed with respect to the set of computing resources. Aspects of the disclosure relate to the recognition that, in certain embodiments, physical node boundaries may impose restrictions which may make it difficult for a system to use resources effectively and complete workloads. Accordingly, aspects of the disclosure relate to configuring a set of floating (e.g., alterable) node boundaries beyond the established physical inter-node connections to facilitate virtual machine mobility. Generally, configuring can include creating, setting-up, organizing, building, assembling, forming, arranging, specifying, designating, or otherwise establishing the set of floating node boundaries. The set of floating node boundaries may include borders, perimeters, limits, or other interfaces between nodes that may be dynamically changed, altered, or modified. The set of floating node boundaries may differ from the physical hardware connections between the set of nodes. In embodiments, configuring the set of floating node boundaries may include defining a shared logic domain for a subset of nodes of the single multi-node server, such that one or more hypervisors (e.g., the source hypervisor, target hypervisor) may access and manage resources for the subset of nodes (e.g., the subset of nodes "float" between hypervisors). In embodiments, configuring the set of floating node boundaries may include establishing communication connections (e.g., via SMP buses) between a first processor of a first node of the single multi-node server and a second processor of a second node of the single multi-node server, and migrating processor and memory resources to a segment (e.g., edge) of either the first or second nodes such that the control of the processor and memory resources may be assumed by another hypervisor. In embodiments, configuring the set of floating node boundaries may include partitioning the single multi-node server (e.g., using an nPartitioning technique) at socket granularity (e.g., configuring each network socket of each node individually) into a plurality of separate partitions, and enabling each respective partition of the plurality of partitions to run on a different hypervisor. Other methods of configuring the set of floating node boundaries are also possible.

In embodiments, an unreassignable portion may be detected at module 724. It may be detected that the set of computing resources includes both an unreassignable portion and a reassignable portion which relates to the possessed subset of the set of computing resources which is possessed by the running virtual machine. The detecting may be performed with respect to the first temporal period. Generally, detecting can include sensing, recognizing, discovering, identifying, or otherwise ascertaining that the set of computing resources includes both the unreassignable portion and the reassignable portion. The unreassignable portion may include a part, piece, section, or segment of the set of computing resources that may not be relocated, transferred, handed-over, or otherwise assigned to another hypervisor. As an example, the unreassignable portion may include an I/O connection that is used by other virtual machines of a particular node (e.g., such that reassignment of the I/O connection would disrupt operation of the other virtual machines of the node). The reassignable portion may include a part, piece, section, or segment of the possessed subset of the set of computing resources for the running virtual machine that may be relocated, transferred, handed-over, or otherwise assigned to another hypervisor. As an example, the reassignable portion may include a memory allocation that may be assigned for use by another node of the single multi-node server. In embodiments, detecting may include using the single service processor to examine a set of allocation permissions for the set of computing resources, and ascertain those subsets of computing resources that are allowed to be allocated/relocated for management by other nodes/hypervisors (e.g., the reassignable portion) as well as those subsets of computing resources that are not allowed (e.g., prevented) from allocation/relocation for other nodes/hypervisors (e.g., the unreassignable portion). In embodiments, the unreassignable portion and the reassignable portion may be detected with respect to the first temporal period (e.g., while the running virtual machine is controlled by the source hypervisor.

In embodiments, a coupled status of the unreassignable portion and the source hypervisor may be maintained. The maintaining may be performed with respect to both the first and second temporal periods. Generally, maintaining can include keeping, preserving, continuing, conserving, persisting, or otherwise retaining the coupled status of the unreassignable portion and the source hypervisor. The coupled status may include a configuration of the unreassignable portion and the source hypervisor in which the unreassignable portion is linked, connected with, paired with, or managed by the source hypervisor (e.g., exclusively controlled by; not connected with another hypervisor). In embodiments, maintaining the coupled status of the unreassignable portion and the source hypervisor may include retaining the unreassignable portion of the set of computing resources on a node included in the logical domain of the source hypervisor (e.g., preventing the unreassignable portion from being transferred to an external node). In embodiments, the reassignable portion may be transferred to a different set of computing resources which is coupled with the source hypervisor. The transferring may be performed with respect to the first temporal period. Generally, transferring can include relocating, moving, delivering, or otherwise passing assignment of the reassignable portion to a different set of computing resources which is coupled with the source hypervisor. The different set of computing resources coupled with the source hypervisor may include a pool of computing resources accessible by/under the control of the source hypervisor. The different set of computing resources may differ from (e.g., be separate from, not overlap with, be mutually exclusive with respect to) the set of computing resources. In embodiments, transferring may include migrating the reassignable portion to a separate node of the source hypervisor. As an example, transferring may include allocating a set of memory resources from a first node to a second node, where both the first and second nodes are controlled by the source hypervisor. Other methods of maintaining the coupled status of the unreassignable portion and transferring the reassignable portion to a different set of computing resources are also possible.

The reassignable portion may be assigned to the target hypervisor from the source hypervisor. Generally, assigning can include relegating, ceding, handing-over, allotting, or otherwise allocating the reassignable portion to the target hypervisor. In embodiments, assigning may include passing control of the reassignable portion of the set of computing resources from the source hypervisor to the target hypervisor. As an example, in certain embodiments, assigning may include configuring a set of communication connections (e.g., SMP buses) to cede control of a node that controls the different set of computing resources (e.g., the different set of computing resources to which the reassignable portion was transferred) from the source hypervisor to the target hypervisor. As such, control of the different set of computing resources, including the reassignable portion, may be assumed by the target hypervisor. In embodiments, the running virtual machine using the reassignable portion may be run using the target hypervisor. Generally, running can include performing, implementing, utilizing, executing, managing, or otherwise operating the running virtual machine on the target hypervisor using the reassignable portion. In embodiments, running may include using the target hypervisor to allocate the reassignable portion of the computing resources for use by the running virtual machine to facilitate performance and execution of workload processing tasks/activities. As such, the unreassignable portion may be maintained by the source hypervisor, and the reassignable portion may be dynamically assigned to the target hypervisor to facilitate virtual machine mobility and operation of the running virtual machine. Other methods of assigning the reassignable portion to the target hypervisor and running the running virtual machine on the target hypervisor using the reassignable portion are also possible.

In embodiments, a resource transfer threshold may be sensed at module 725. The sensing may be performed with respect to the source hypervisor. Aspects of the disclosure relate to the recognition that, in some situations, it may not be desirable to transfer more than a certain amount of computing resources from one hypervisor to another. Accordingly, aspects of the disclosure relate to sensing a resource transfer threshold and copying a remainder subset of the set of computing resources to a set of target computing resources coupled with the target hypervisor. Generally, sensing can include detecting, recognizing, discovering, identifying, or otherwise ascertaining the resource transfer threshold. The resource transfer threshold may include a requirement, stipulation, boundary, condition, or other parameter that defines a limit, cap, ceiling, or other restriction on the amount of resources that may be transferred from the source hypervisor to the target hypervisor. In embodiments, the resource transfer threshold may define the amount of resources that the source hypervisor wishes to maintain control over (e.g., to facilitate performance of its own workloads). In embodiments, sensing the resource transfer threshold may include examining the workloads maintained by the nodes and virtual machines of the source hypervisor with respect to the set of computing resources to calculate the amount of resources used (e.g., needed) by the source hypervisor, and computing a resource transfer threshold to prevent too many computing resources from being transferred to the target hypervisor. As an example, sensing may include computing a resource transfer threshold of "12 gigabytes of memory" and "8 gigahertz of processing resources" such that at least the amount of resources defined by the resource transfer threshold are maintained by the source hypervisor. In embodiments, a remainder subset of the set of computing resources which is possessed by the running virtual machine may be copied to a set of target computing resources coupled with the target hypervisor. Generally, copying can include relocating, moving, delivering, replicating, duplicating, or otherwise allocating the remainder subset of the set of computing resources to the set of target computing resources coupled with the target hypervisor. The remainder subset may include a portion of the set of computing resources besides the resources designated by the resource transfer threshold (e.g., leftover or extra resources). The set of target computing resources may include a pool of computing resources controlled by the target hypervisor (e.g., processor-managed memory of the target hypervisor). In embodiments, copying may include deploying the remainder subset of the set of computing resources to the set of target computing resources to cede control of the remainder subset to the target hypervisor. Consider the following example. A source hypervisor may maintain a set of computing resources including 50 gigabytes of memory and 40 gigahertz of processing resources. As described herein, a resource transfer threshold of "15 gigabytes of memory" and "21 gigahertz of processing resources" may be detected based on a calculation of the necessary resources for the source hypervisor. Accordingly, a remainder subset of "35 gigabytes of memory and 19 gigahertz of processing resources" (e.g., resources exceeding the designated resource transfer threshold) may be copied to the set of target computing resources for management by the target hypervisor. Other methods of sensing the resource transfer threshold and copying the remainder subset of the set of computing resources to the set of target computing resources coupled with the target hypervisor are also possible.

In embodiments, a resource reception threshold may be sensed at module 726. The sensing may be performed with respect to the target hypervisor. Generally, sensing can include detecting, recognizing, discovering, identifying, or otherwise ascertaining the resource reception threshold. The resource reception threshold may include a requirement, stipulation, boundary, condition, or other parameter that defines a limit, cap, ceiling, or other restriction on the amount of resources that the target hypervisor may receive (e.g., from the source hypervisor). In embodiments, sensing the resource reception threshold may include examining a resource balance criterion for the single multi-node server that defines the maximum amount of resources that a single hypervisor may maintain (e.g., to facilitate load-balancing between hypervisors), and calculating the resource reception criterion based on the resource balance criterion. As an example, sensing may include computing a resource reception threshold of "7 gigabytes of memory" and "15 gigahertz of processing resources" such that resources may only be received by the target hypervisor up to the amount defined by the resource reception threshold. In embodiments, a remainder subset of the set of computing resources which is possessed by the running virtual machine may be copied to a set of target computing resources coupled with the target hypervisor. Generally, copying can include relocating, moving, delivering, replicating, duplicating, or otherwise allocating the remainder subset of the set of computing resources to the set of target computing resources coupled with the target hypervisor. The remainder subset may include a portion of the set of computing resources up to the limit specified by the resource reception threshold. As described herein, the set of target computing resources may include a pool of computing resources controlled by the target hypervisor (e.g., processor-managed memory of the target hypervisor). In embodiments, copying may include deploying the remainder subset of the set of computing resources to the set of target computing resources to cede control of the remainder subset to the target hypervisor. Consider the following example. A source hypervisor may maintain a set of computing resources including 70 gigabytes of memory and 60 gigahertz of processing resources. As described herein, a resource reception threshold of "20 gigabytes of memory" and "25 gigahertz of processing resources" may be sensed based on a calculation using the resource balance criterion. The source hypervisor may communicate with the target hypervisor to ascertain the resource reception threshold, and initiate a transfer of 20 gigabytes of memory and 25 gigahertz of processing resources in accordance with the resource reception threshold of the target hypervisor. Other methods of sensing the resource reception threshold and copying the remainder subset of the set of computing resources to the set of target computing resources coupled with the target hypervisor are also possible In embodiments, less than one-hundred percent of a memory feature of the running virtual machine may be copied to a set of target computing resources coupled with the target hypervisor at module 727. Aspects of the disclosure, in embodiments, relate to avoiding complete virtual machine/resource migration operations between the source hypervisor and the target hypervisor via dynamic assigning of computing resources (e.g., to avoid lengthy migration operations and virtual machine down-time). Accordingly, aspects of the disclosure relate to copying less than one-hundred-percent of a memory feature of the running virtual machine. Generally, copying can include relocating, moving, delivering, replicating, duplicating, migrating, or otherwise allocating less than one-hundred-percent of the memory feature of the running virtual machine to the set of target computing resources coupled with the target hypervisor. The memory feature may include the main memory (e.g., primary storage), random-access memory (RAM), cache memory, or data/information maintained by the running virtual machine. In embodiments, copying may include performing a partial memory move between the source hypervisor and the target hypervisor. For instance, copying may include determining that a first portion of the memory feature (e.g., 80% of the memory feature) has been dynamically assigned from the source hypervisor to the target hypervisor, and subsequently initiating a migration operation to transfer a second portion of the memory feature (e.g., 15% of the memory feature) to the set of target computing resources of the target hypervisor (e.g., resource pool managed by the target hypervisor). Other methods of copying less than one-hundred percent of the memory feature of the running virtual machine to the set of target computing resources coupled with the target hypervisor are also possible.

In embodiments, a plurality of virtual machines may be consolidated at module 728. The plurality of virtual machines may be consolidated across a set of physical servers below a threshold number. In embodiments, aspects of the disclosure relate to the recognition that spreading out virtual machines over a number of physical servers (e.g., nodes, processors) may be associated with real-estate costs, boundary maintenance regulations, and other challenges. Accordingly, aspects of the disclosure relate to consolidating the plurality of virtual machines across a set of physical servers below a threshold number. Generally, consolidating can include gathering, joining, centralizing, combining, assembling, or otherwise aggregating, the plurality of virtual machines across the set of physical servers below a threshold number. The threshold number may indicate a limit, cap, maximum, ceiling, or other restriction on the number of physical servers that may be used to host the plurality of virtual machines. For instance, in certain embodiments, the threshold number may be "2" (e.g., the plurality of virtual machines are to be consolidated on a single server). In embodiments, consolidating may include dynamically assigning or migrating a plurality of virtual machines spread out over a first number of servers (e.g., 5) to a second number of servers, where the second number of servers is less than the first number of servers (e.g., 3). In embodiments, as described herein, aspects of the disclosure relate to consolidating the plurality of virtual machines on a single multi-node server. As an example, memory features, application data, operating system images, and other operating configuration elements of the plurality of virtual elements may be transferred to the single multi-node server, and deployed on one or more nodes of the single multi-node server. As such, running multiple hypervisors on a single multi-node server may facilitate workload consolidation across less physical servers in a datacenter. Other methods of consolidating the plurality of virtual machines across a set of physical servers below a threshold number are also possible.

In embodiments, at least a portion of the set of computing resources may be defragmented at module 748. The defragmenting may be performed in advance of assigning the possessed subset of the set of computing resources which is possessed by the running virtual machine to the target hypervisor from the source hypervisor. Aspects of the disclosure relate to the recognition that, in some situations, a portion of the set of computing resources may be in use by one or more nodes of the single multi-node server. Accordingly, aspects of the disclosure relate to defragmenting the portion of the computing resources to assemble them for dynamic assignment to the target hypervisor. Generally, defragmenting can include collecting, arranging, gathering, assembling, organizing, assembling, accumulating, compiling, or otherwise aggregating the set of computing resources. In embodiments, defragmenting may include gathering the possessed subset of the set of computing resources in a central location (e.g., single node) to facilitate subsequent assignment to the target hypervisor. For instance, defragmenting may include analyzing the single multi-node server to ascertain which nodes are making use of portions of the possessed subset of the set of computing resources, and assembling the portions of the possessed subset on a single node of the single multi-node server. As described herein, the assembled portions of the possessed subset may subsequently be assigned to the target hypervisor. Other methods of defragmenting the portion of the set of computing resources are also possible.

Figure 8:
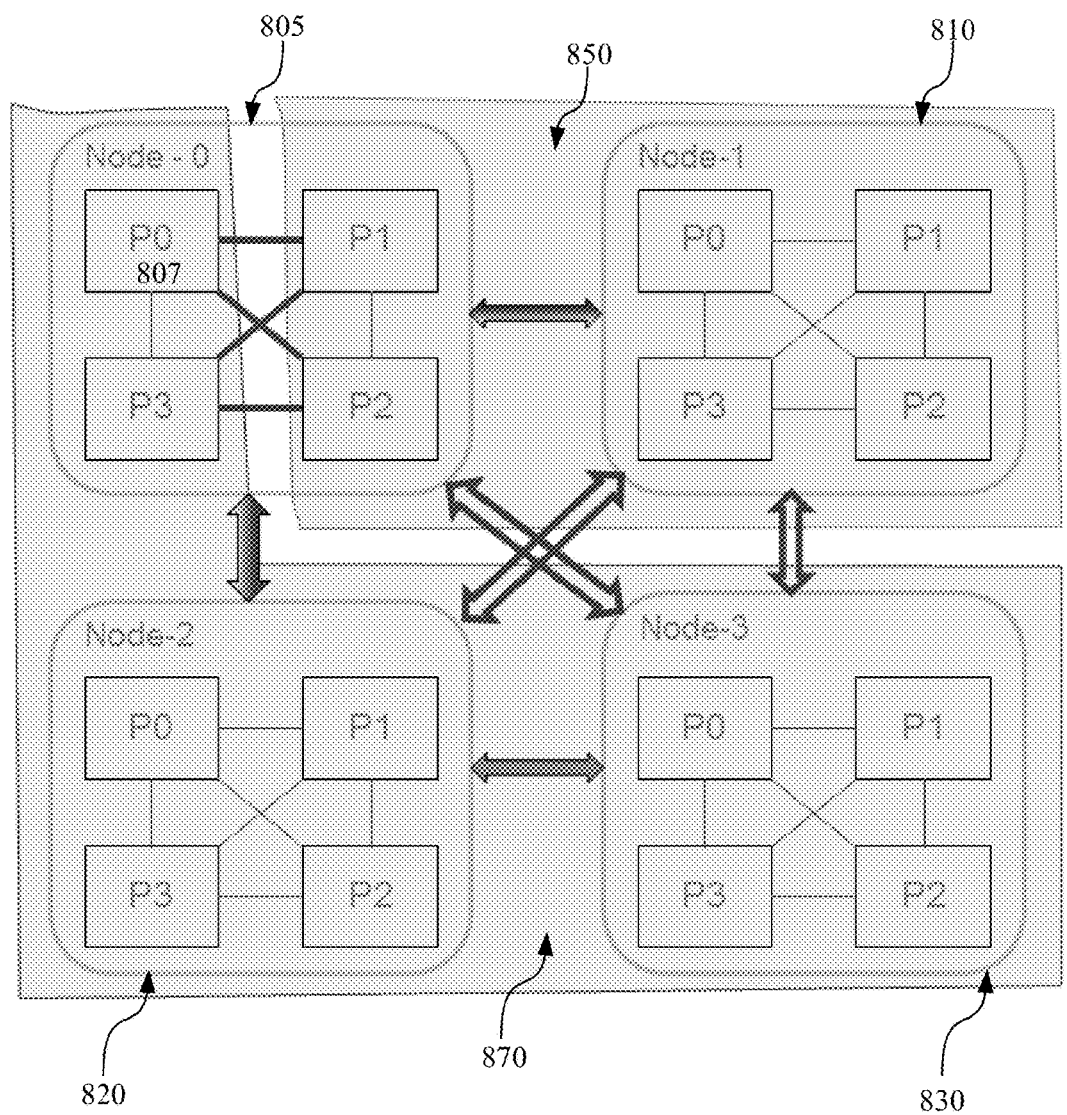
FIG. 8 illustrates an example initial system configuration for virtual machine management in a shared pool of configurable computing resources, according to embodiments.

FIG. 8 illustrates an example initial system configuration 800 for virtual machine management in a shared pool of configurable computing resources, according to embodiments. In certain embodiments, the initial system configuration 800 may illustrate the state of a single multi-node server with respect to a first temporal period. Aspects of the initial system configuration 800 relate to a system topology for a single multi-node server having a plurality of nodes. As shown in FIG. 8, the initial system configuration 800 may include a Node 0 805, a Node 1 810, a Node 2 820, and a Node 3 830. Each node of the plurality of nodes may include four sets of computing resources (e.g., P0, P1, P2, P3). The sets of computing resources may be used to operate virtual machines on the plurality of nodes. In embodiments, the initial system configuration 800 may include a target hypervisor 850 configured to manage Node 1 810 and a first portion of Node 0 805, and a source hypervisor 870 configured to manage Node 2 820, Node 3 830, and a second portion of Node 0 805. In embodiments, as describe herein, aspects of the disclosure relate to dynamically allocating a set of resources from the source hypervisor 870 to the target hypervisor 850 to cede control of a virtual machine from the source hypervisor 870 to the target hypervisor 850 without performing a migration operation. For instance, in embodiments, a set of computing resources 807 may be dynamically allocated from the source hypervisor 870 to the target hypervisor 850.

Figure 9:
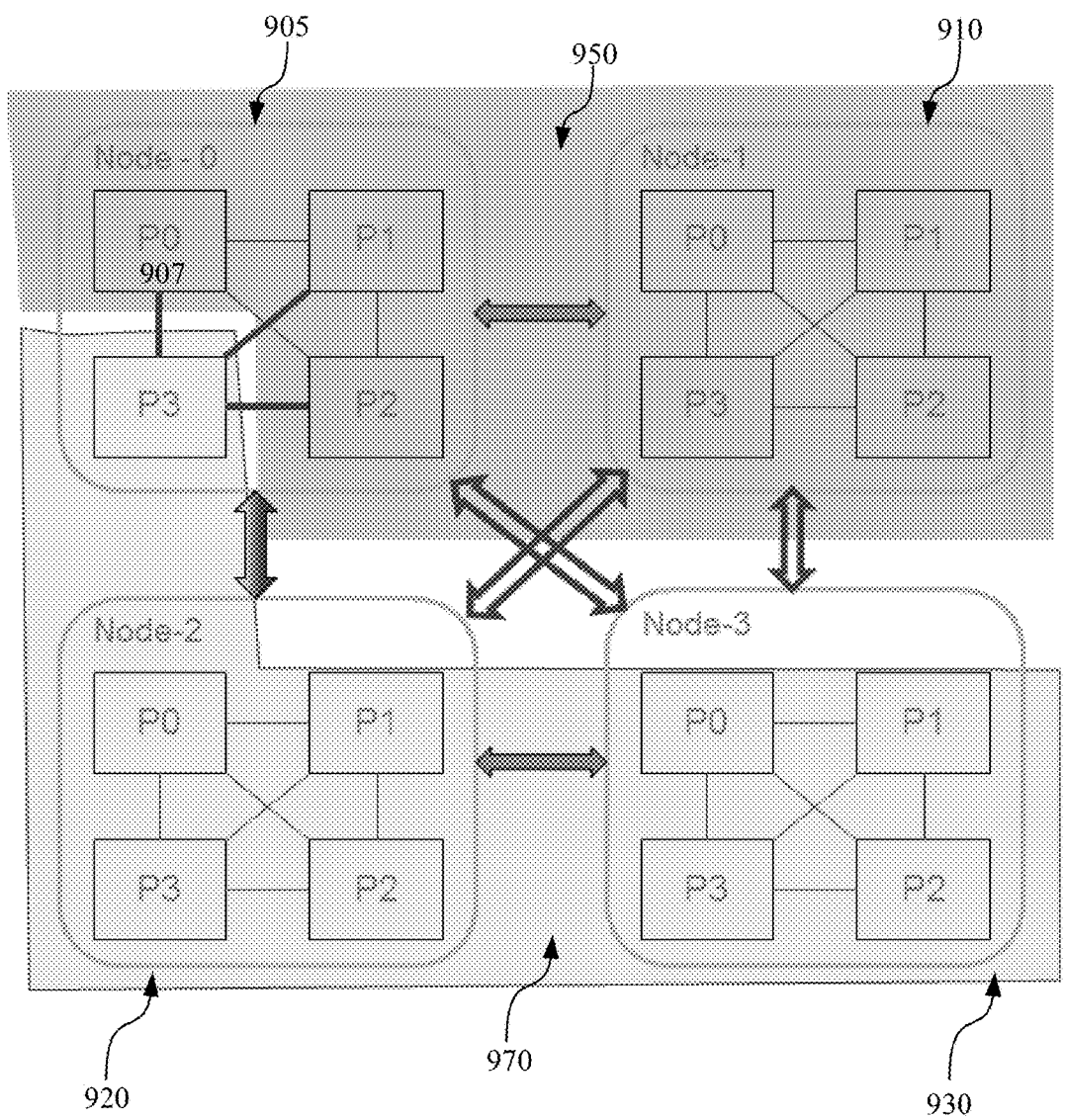
FIG. 9 illustrates an example subsequent system configuration for virtual machine management in a shared pool of configurable computing resources, according to embodiments.

FIG. 9 illustrates an example subsequent system configuration 900 for virtual machine management in a shared pool of configurable computing resources, according to embodiments. In certain embodiments, the subsequent system configuration 900 may illustrate the state of a single multi-node server with respect to a second temporal period. Aspects of the subsequent system configuration 900 relate to a system topology for a single multi-node server having a plurality of nodes including a Node 0 905, a Node 1 910, a Node 2 920, and a Node 3 930. Each node of the plurality of nodes may include four sets of computing resources (e.g., P0, P1, P2, P3) that may be used to operate virtual machines. In embodiments, the subsequent system configuration may include a source hypervisor 970 and a target hypervisor 950. As described herein, aspects of the disclosure relate to dynamically allocating a set of resources from the source hypervisor 970 to the target hypervisor 950 to cede control of a virtual machine from the source hypervisor 970 to the target hypervisor 950 without performing a migration operation. As an example, consider a virtual machine that is managed by the source hypervisor 970 that needs to be transferred to the target hypervisor 950. The resources for the virtual machine (e.g., processor and memory) may correspond to the set of resources 907 of Node 0 905. Accordingly, as shown in FIG. 9, a logical domain for the target hypervisor 950 may be expanded to assume control of the set of resources 907. In this way, the set of resources 907 may be dynamically assigned to the target hypervisor 950, allowing the target hypervisor 950 to manage the virtual machine corresponding to the set of resources 907. Other methods of virtual machine management in a shared pool of configurable computing resources are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for virtual machine management in a shared pool of configurable computing resources, the method comprising:
    establishing a single multi-node server that includes:
        a running virtual machine,
        a set of computing resources that includes a possessed subset of the set of computing resources which is possessed by the running virtual machine,
        a source hypervisor which has the running virtual machine with respect to a first temporal period, wherein the source hypervisor is configured to manage the possessed subset of the set of computing resources, and
        a target hypervisor to have the running virtual machine with respect to a second temporal period which is subsequent to the first temporal period, wherein the target hypervisor is configured to manage the possessed subset of the set of computing resources;
    assigning, to the target hypervisor from the source hypervisor, the possessed subset of the set of computing resources which is possessed by the running virtual machine;
    configuring, using a single service processor, both the source and target hypervisors;
    communicating, via the single service processor, a set of scheduling-related control information for the running virtual machine from the source hypervisor to the target hypervisor;
    running, using the target hypervisor, the running virtual machine;
    detecting, with respect to the first temporal period, that the set of computing resources includes both an unreassignable portion and a reassignable portion which relates to the possessed subset of the set of computing resources which is possessed by the running virtual machine;
    maintaining, with respect to both the first and second temporal periods, a coupled status of the unreassignable portion and the source hypervisor;
    transferring, with respect to the first temporal period, the reassignable portion to a different set of computing resources which is coupled with the source hypervisor;
    assigning, to the target hypervisor from the source hypervisor, the reassignable portion; and
    running, using the target hypervisor, the running virtual machine using the reassignable portion.

2. The method of claim 1, further comprising:
    transferring, to the target hypervisor from the source hypervisor, management of the running virtual machine without copying a set of running virtual machine data from a set of memory regions.

3. The method of claim 1, further comprising:
    detecting that the running virtual machine is running across a plurality of nodes of the single multi-node server; and
    transferring, to the target hypervisor from the source hypervisor, assignment of the possessed subset of the set of computing resources.

4. The method of claim 1, further comprising:
    assembling, with respect to the first temporal period, a set of memory regions of a segment of a node coupled with the source hypervisor;

coupling, with respect to the second temporal period, the target hypervisor with the set of memory regions of the segment of the node; and decoupling, with respect to the second temporal period, the source hypervisor with the set of memory regions of the segment of the node.

5. The method of claim 1, further comprising:
constructing, by the single service processor, a serial communication between the source and target hypervisors to send the set of scheduling-related control information for the running virtual machine from the source hypervisor to the target hypervisor when transferring the running virtual machine from the source hypervisor to the target hypervisor.

6. The method of claim 1, further comprising:
establishing the single multi-node server that includes:
a different virtual machine,
a first node having the set of computing resources that includes a different subset of the set of computing resources which is possessed by the different virtual machine with respect to the first temporal period, and
the source hypervisor which has the different virtual machine with respect to both the first and second temporal periods;
coupling, with respect to the first temporal period, the first node with the source hypervisor;
transferring, from the first node to a second node which is coupled with the source hypervisor, one or more elements of the different subset of the set of computing resources which is possessed by the different virtual machine; and
coupling, with respect to the second temporal period, the first node with the target hypervisor.

7. The method of claim 1, further comprising:
configuring, with respect to the set of computing resources, a set of floating node boundaries.

8. The method of claim 1, further comprising:
defragmenting, in advance of assigning the possessed subset of the set of computing resources which is possessed by the running virtual machine to the target hypervisor from the source hypervisor, at least a portion of the set of computing resources.

9. The method of claim 1, further comprising:
sensing, with respect to the source hypervisor, a resource transfer threshold; and
copying, to a set of target computing resources coupled with the target hypervisor, a remainder subset of the set of computing resources which is possessed by the running virtual machine.

10. The method of claim 1, further comprising:
sensing, with respect to the target hypervisor, a resource reception threshold; and
copying, to a set of target computing resources coupled with the target hypervisor, a remainder subset of the set of computing resources which is possessed by the running virtual machine.

11. The method of claim 1, further comprising:
copying, to a set of target computing resources coupled with the target hypervisor, less than one-hundred percent of a memory feature of the running virtual machine.

12. The method of claim 1, further comprising:
consolidating a plurality of virtual machines across a set of physical servers below a threshold number.

13. The method of claim 1, further comprising:
performing, in a dynamic fashion to streamline virtual machine management in the shared pool of configurable computing resources, each of:
the establishing, the assigning, and the running.

14. The method of claim 1, further comprising:
performing, in an automated fashion without user intervention, each of:
the establishing, the assigning, and the running.

15. The method of claim 1, further comprising:
transferring, to the target hypervisor from the source hypervisor, management of the running virtual machine without copying a set of running virtual machine data from a first set of memory regions;
detecting that the running virtual machine is running across a plurality of nodes of the single multi-node server;
transferring, to the target hypervisor from the source hypervisor, assignment of the possessed subset of the set of computing resources;
assembling, with respect to the first temporal period, a second set of memory regions of a segment of a node coupled with the source hypervisor;
coupling, with respect to the second temporal period, the target hypervisor with the second set of memory regions of the segment of the node;
decoupling, with respect to the second temporal period, the source hypervisor with the second set of memory regions of the segment of the node;
configuring, using a single service processor, both the source and target hypervisors;
communicating, via the single service processor, a set of scheduling-related control information for the running virtual machine from the source hypervisor to the target hypervisor;
constructing, by the single service processor, a serial communication between the source and target hypervisors to send the set of scheduling-related control information for the running virtual machine from the source hypervisor to the target hypervisor when transferring the running virtual machine from the source hypervisor to the target hypervisor.

16. A system for virtual machine management with respect to a shared pool of configurable computing resources, the system comprising:
a memory having a set of computer-readable computer instructions, and
a processor for executing the set of computer-readable instructions, the set of computer-readable instructions including:
establishing a single multi-node server that includes:
a running virtual machine,
a set of computing resources that includes a possessed subset of the set of computing resources which is possessed by the running virtual machine,
a source hypervisor which has the running virtual machine with respect to a first temporal period, wherein the source hypervisor is configured to manage the possessed subset of the set of computing resources, and
a target hypervisor to have the running virtual machine with respect to a second temporal period which is subsequent to the first temporal period, wherein the target hypervisor is configured to manage the possessed subset of the set of computing resources;

assigning, to the target hypervisor from the source hypervisor, the possessed subset of the set of computing resources which is possessed by the running virtual machine;

configuring, using a single service processor, both the source and target hypervisors;

communicating, via the single service processor, a set of scheduling-related control information for the running virtual machine from the source hypervisor to the target hypervisor; and running, using the target hypervisor, the running virtual machine;

detecting, with respect to the first temporal period, that the set of computing resources includes both an unreassignable portion and a reassignable portion which relates to the possessed subset of the set of computing resources which is possessed by the running virtual machine;

maintaining, with respect to both the first and second temporal periods, a coupled status of the unreassignable portion and the source hypervisor;

transferring, with respect to the first temporal period, the reassignable portion to a different set of computing resources which is coupled with the source hypervisor;

assigning, to the target hypervisor from the source hypervisor, the reassignable portion; and running, using the target hypervisor, the running virtual machine using the reassignable portion.

17. A computer program product for virtual machine management with respect to a shared pool of configurable computing resources, the computer program product comprising a computer-readable storage medium having program instructions embodied therewith, wherein the computer-readable storage medium is not a transitory signal per se, the program instructions executable by a processor to cause the processor to perform a method comprising:

establishing a single multi-node server that includes:
a running virtual machine,
a set of computing resources that includes a possessed subset of the set of computing resources which is possessed by the running virtual machine,
a source hypervisor which has the running virtual machine with respect to a first temporal period, wherein the source hypervisor is configured to manage the possessed subset of the set of computing resources, and
a target hypervisor to have the running virtual machine with respect to a second temporal period which is subsequent to the first temporal period, wherein the target hypervisor is configured to manage the possessed subset of the set of computing resources;

assigning, to the target hypervisor from the source hypervisor, the possessed subset of the set of computing resources which is possessed by the running virtual machine;

configuring, using a single service processor, both the source and target hypervisors;

communicating, via the single service processor, a set of scheduling-related control information for the running virtual machine from the source hypervisor to the target hypervisor; and running, using the target hypervisor, the running virtual machine;

detecting, with respect to the first temporal period, that the set of computing resources includes both an unreassignable portion and a reassignable portion which relates to the possessed subset of the set of computing resources which is possessed by the running virtual machine;

maintaining, with respect to both the first and second temporal periods, a coupled status of the unreassignable portion and the source hypervisor;

transferring, with respect to the first temporal period, the reassignable portion to a different set of computing resources which is coupled with the source hypervisor;

assigning, to the target hypervisor from the source hypervisor, the reassignable portion; and running, using the target hypervisor, the running virtual machine using the reassignable portion.

* * * * *